Oct. 21, 1969 J. K. FRANTZ 3,474,265
ELECTRONIC NETWORK FOR MACHINE COUNTING OPERATIONS
Filed Sept. 9, 1966 2 Sheets-Sheet 1

INVENTOR.
JOHN K. FRANTZ
BY Fulwider, Patton, Rieber,
Lee, and Utecht
ATTORNEYS

Oct. 21, 1969  J. K. FRANTZ  3,474,265
ELECTRONIC NETWORK FOR MACHINE COUNTING OPERATIONS
Filed Sept. 9, 1966  2 Sheets-Sheet 2
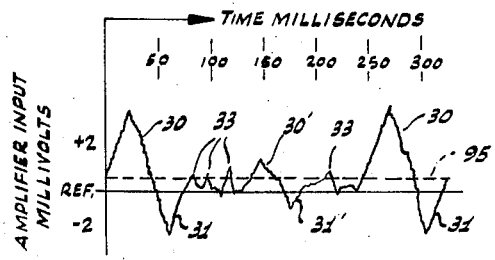
Fig. 2
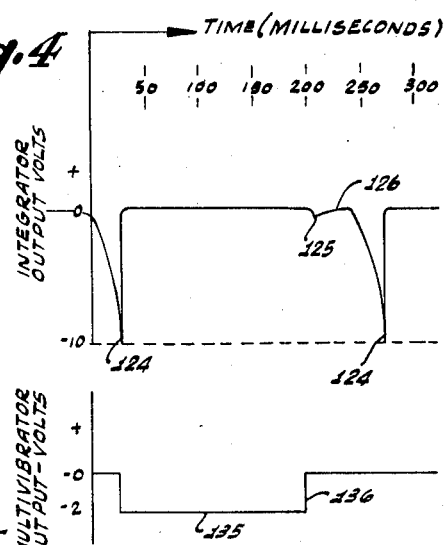
Fig. 4
Fig. 5
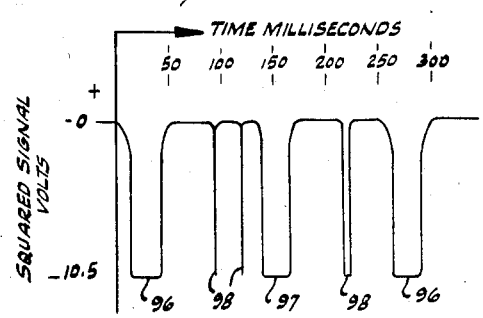
Fig. 3
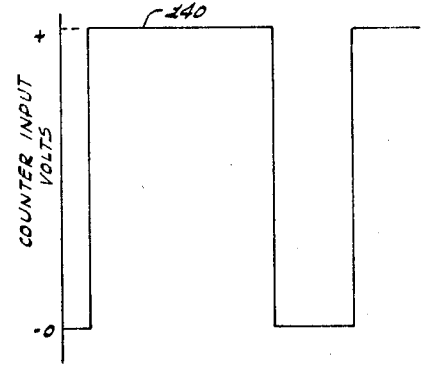
Fig. 6
INVENTOR.
JOHN K. FRANTZ
BY Fylwider, Patton, Rieber, Lee, and Utecht
ATTORNEYS

United States Patent Office 3,474,265
Patented Oct. 21, 1969

3,474,265
ELECTRONIC NETWORK FOR MACHINE
COUNTING OPERATIONS
John K. Frantz, Canoga Park, Calif., assignor to The National Screw & Manufacturing Company, Los Angeles, Calif., a corporation of Ohio
Filed Sept. 9, 1966, Ser. No. 578,332
Int. Cl. G06m 1/27; H03k 1/10
U.S. Cl. 307—308                                    9 Claims

ABSTRACT OF THE DISCLOSURE

An improved electrical system for detecting and counting strokes in machine operations, the system including strain gauge means for developing A.C. voltages proportional to stresses, voltage amplifier means, filtering means, and electronic means responsive to the amplified and filtered voltage for providing output corresponding only to certain time correlated stresses in each cycle monitored.

---

This invention relates to parts forming machines, and more particularly to an improved system for detecting machine operations and operating a counter.

More specifically, this invention relates to a system for counting the operations of a machine in response to changes in resistance of a strain gauge mounted thereon. A novel system for this purpose is disclosed in a copending application of applicant and George A, Hatherell, "Stroke Counting System fom Machine Operations," Ser. No. 540,738, filed Apr. 6, 1966.

The operation of such system can be adversely affected by high frequency vibrations of a machine. Such vibrations are reflected in high frequency components superimposed on voltages developed from dimensional changes in the strain gauge, both during and intermediate the operations which are to be counted. Dimensional changes in the strain gauge also occur between work blows which are reflected as random noise spikes in the derived voltages. As a result, the counter is made to falsely indicate a part forming stroke.

It is an object of my invention to provide improved electronic circuitry of a stroke counting system which overcomes the above and other disadvantages of the prior art.

It is another object of my invention to provide an improved electronic network which prevents any machine vibrations from causing false indications of part forming strokes.

It is also an object of my invention to provide a simple and inexpensive network for counting strokes of a machine.

The above and other objects and advantages of my invention will become apparent from the following description taken in conjunction with the accompanying drawings, in which:

FIGURES 2-6 are waveforms of voltages developed at different points in the network of FIGURE 1, to aid in explaining my invention.

Figure 1:
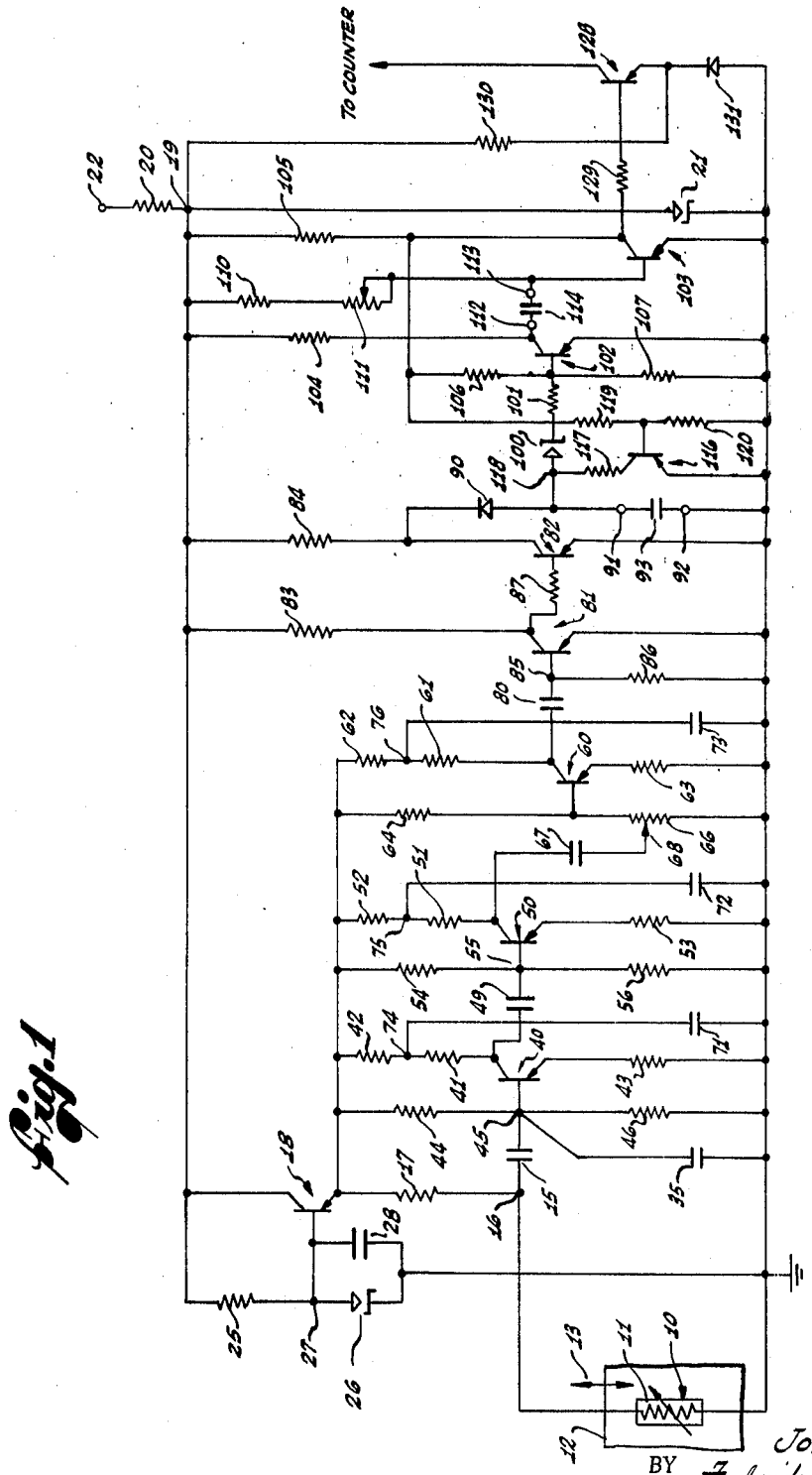
FIGURE 1 is a schematic diagram of the electronic network of my invention.

Referring to FIGURE 1, a strain gauge 10, symbolized as a variable resistor 11, is mounted on a portion of a parts forming machine, indicated generally at 12, which undergoes stress during forming operations. Preferably, the strain gauge 10 is oriented on a portion of the machine 12 which, as indicated by the arrow 13, undergoes expansion and contraction during part forming operations, all in a well known manner. The strain gauge 10 may be any of a number of strain gauges available on the market, including the ultrasensitive types formed of semiconductor materials, e.g., silicon strain sensor elements.

The resistor 11 is connected at one end to a point of reference potential, indicated as ground, and its other end is capacitively coupled at 15 to an amplifier section. The junction 16 of the resistor 11 and capacitor 15 is connected through a dropping resistor 17 to a source of unvarying D-C voltage. In this connection, the resistor 17 is connected to the emitter of a PNP junction transistor 18, the collector of which is connected to the junction 19 of a resistor 20 and a Zener diode 21 that are serially connected between ground and a voltage terminal 22. The resistor 20 is a dropping resistor, and the Zener diode 21 cooperates therewith to establish a regulated voltage of desired magnitude at the junction 19. For example, the voltage at the terminal 22 may be of the order of −24 v., with the Zener having a breakdown characteristic so as to cause the voltage at the junction 19 to be a regulated voltage of desired magniture, e.g., −12 v.

The regulated voltage thus provided is utilized to develop a further or super-regulated voltage of lower magnitude for operation of the amplifiers, and for providing an unvarying D-C voltage of selected magnitude at the junction 16 to which the strain gauge resistor 11 is connected. To this end, a resistor 25 and a Zener diode 26 are connected in series between the resistor 20 and ground. The transistor 18 has a base connection to the junction 27 of the resistor 25 and the Zener diode 26, and a capacitor 28 is connected across the Zener diode 26. As with the resistor 20 and Zener 21, the resistor 25 and the Zener 26 cooperate to establish a regulated voltage of desired magnitude at the base of the transistor 18. The capacitor 28 is provided to effectively filter out any alternating excursions which may occur as a result of fluctuations of the regulated voltage at the junction 19.

By thus regulating the already regulated voltage, the base and emitter of the transistor 18 are held at a D-C voltage potential that is unvarying in magnitude. Due to the voltage drop across the resistor 25, the D-C voltage appearing at the top of the resistor 17 is one of a predetermined magnitude lower than the regulated voltage at the junction 19 previously described. For example, the super-regulated voltage appearing at the top of the resistor 17 may be of the order of 8.0 volts. Further, the resistor 17 is chosen so that the voltage drop across it establishes a D-C reference potential at the junction 16 of a desired lower value, e.g., 4.0 volts.

With the above-described arrangement, voltage fluctuations occur at the junction 16 as a result of changes in the resistance of the resistor 11, as the portion of the machine 12 and the strain gauge 10 mounted thereon are undergoing stress. Due to the capacitive coupling at 15, such voltage fluctuations are applied to the amplifier section as A-C voltages.

Preparatory to describing the amplifier section previously mentioned, it should be noted that the circuit of my invention must process extremely low frequency A-C voltages. When the machine 12 forms a part, e.g., heading a bolt, forming threads on a bolt, punching a part, or the like, the actual work blow may, for example, be acomplished in a period of 50-ms. (milliseconds). In such case, the voltage variation due to the work blow alone is of the order of 20-c.p.s. However, the machine frame is constantly being vibrated at higher frequencies, due to unavoidable "ringing" of the frame while the machine is in operation. Thus, the resistor 11 is always undergoing change while the machine is operating, so that A-C voltage fluctuations occur at the junction 16, and hence across the capacitor 15, which vary in accordance with such higher frequency variations. Such variations, of course, are superimposed upon the voltage excursions representing the work blows of the machine.

FIGURE 2 illustrates the manner in which the voltage from the capacitor 15 varies during and between work blows of the machine. The voltage excursions representing the main work blows are indicated at 30, and as will be observed have superimposed thereon the fluctuations of varying higher frequencies. At the ends of the work blows 30, which rise to a maximum and decrease in conformance with the expansion and contraction of the frame when operating on a part, the frame undergoes further contraction, as indicated by negative voltage excursions 31, in the process of returning toward a quiescent position.

The waveform of FIGURE 2 illustrates the voltage waveform that is generated by a machine that requires two blows to form a part, e.g., successive blows to enlarge and shape a head on one end of a bolt. As will be seen, shortly after the first work blow 30, and the ensuing return at 31 to the quiescent condition, there occurs a similar positive voltage excursion 30', immediately followed by a negative excursion 31' that coresponds to the negative excursion 31 associated with the main work blow 30. In addition, a number of unwanted noise spikes 33 occur between the work blows 30, 30'. The circuit of my invention is adapted to process the signals so as to eliminate the high frequency variations, and to ignore and avoid counting as work blows the intermediate work blows 30' and the noise spikes 33.

As previously indicated, the voltage waveform depicted in FIGURE 2 is that which is achieved across the capacitor 15. At the junction 16, the voltage may include noise components of considerably higher frequencies than those previously mentioned, e.g., 5,000 c.p.s. or higher. Such higher frequency components preferably are bypassed, as through a grounded capacitor 35, so that they do not appear at the input of the amplifier section.

The super-regulated voltage appearing at the emitter of the transistor 18 is utilized for operating the amplifiers of the amplifier section. In this connection, the capacitor 15 is connected to the base of a PNP junction transistor 40 which has its collector connected to such regulated potential through serially connected resistors 41, 42, and a degeneration resistor 43 is connected between the emitter and ground. Quiescent biasing for the transistor 40 is provided by a resistor 44 connected between the source of super-regulated voltage and the junction 45 between the capacitor 15 and the base of the transistor 40, and a resistor 46 connected between such junction and ground. In conventional fashion, the resistor 43, 44 and 46 are chosen to establish a quiescent emitter-base current flow, whereby any voltage fluctuations appearing at the junction 45 are amplified as desired at the collector of the transistor 40.

Amplified voltages appearing at the collector of the transistor 40 are coupled through a capacitor 49 to the base of a PNP junction transistor 50 of a succeeding amplifier stage. Such amplifier stage is similarly provided with resistors 51, 52 connected between the collector and the source of super-regulated voltage; a resistor 53 connected between the emitter and ground; a resistor 54 connected between such regulated potential source and the junction 55 of the capacitor 49 and the base of the transistor 50; and a resistor 56 connected between the junction 55 and ground.

A further amplifier stage employs a similar transistor 60, with similar resistors 61, 62 connected between the collector and the source of super-regulated voltage, and a resistor 63 connected between the emitter and ground. Also, bias determining resistors 64, 66 are provided which correspond to the bias determining resistors 44, 46 and 54, 56 of the preceding amplifier stages. Similarly, a capacitor 67 is provided for coupling the voltage fluctuations at the collector of the transistor 50 to the base of the transistor 60.

However, the resistor 66 is incorporated in a potentiometer, to the sliding contact 68 of which the capacitor 67 is connected. Such potentiometer is used for gain control, in addition to establishing a quiescent bias for the transistor 60. Such gain control is desirable to compensate for differences in sensitivity of strain gauge sensors employed, and to compensate for differences in gain through the preceding amplifier stages, e.g., as affected by differences in work blows of different machines.

The amplifier stages do not amplify all frequency components of input voltages to the same extent. All frequency components above a predetermined level, e.g., above 200 c.p.s., are successively subjected to a fraction of the gain for frequency components below that level. To this end, respective capacitors 71, 72, 73 are connected betwen ground and the junctions 74, 75, 76 of the associated pairs of resistors 41–42, 51–52 and 61–62. The capacitors 71–73 and the associated pairs of resistors are chosen so that the voltage components above the preselected frequency are effectively bypassed, or rolled off, so that the magnitudes thereof are a predetermined fraction of the magnitudes of the amplified voltage components below that level.

In this connection, each of the resistors 41, 51, 61 may have resistance values of, for example, one-tenth of the resistances of resistors 42, 52, 62. In each amplifier stage, the net effect is that the gain accorded the undesired frequency components is approximately one-tenth that obtained for the frequency components below the desired level. Therefore, of the amplifier voltages appearing at the collector of the transistor 60, the gain accorded frequency components below 200 c.p.s. is many times that for the frequency components above 200 c.p.s. By this technique of selective amplification, I achieve effective roll-off of undesired frequency components, and establish at the output of the amplifier section a smoothed A-C form of the voltage waveform of FIGURE 2.

The smoothed output of the amplifier section is coupled by a capacitor 80 to a squaring network. Such squaring network includes a pair of PNP junction transistors 81, 82, the collectors of which are connected through dropping resistors 83, 84 to the junction 19, and the emitters of which are directly connected to ground. The capacitor 80 is connected to the base of the transistor 81, and to their junction 85, a resistor 86 is connected to ground. A resistive connection 87 is provided between the collector of the transistor 81 and the base of the transistor 82.

The output of the squaring network is integrated. To this end, a diode 90 is connected in the forward direction between the collector of the transistor 82 and one terminal 91 of a pair of terminals 91, 92 between which a capacitor 93 is selected and connected in accordance with a desired time constant (determined by the resistor 84 and the capacitor 93) for the particular machine 12 on which the strain gauge is mounted. As shown, the terminal 92 is connected directly to ground.

The resistor 86 is effective to hold the transistor 81 cut off in the unstressed condition of the strain gauge 10, and establishes a threshold for conduction of the transistor 81. Such threshold, which is indicated at 95 in FIGURE 2, corresponds to those portions of the output of the amplifier section which exceed a predetermined level. The voltage level 95 may, for example, be of the order of 0.3 v.

The transistr 82 is normally conducting, and the transistor 81 is normally cut off. In this connection, it will be noted that the collector of the normally cut-off transistor 81 is near the regulated potential of the junction 19, and a D-C path to ground is established through the resistors 83, 87 and the emitter-base current path of the transistor 82.

When the voltage at the output of the amplifier section exceeds the level 95 indicated in FIGURE 2, the potential on the base of the transistor 81 is such as to permit it to conduct. Such conduction connects the collector of the transistor 81 to ground, whereby the transistor 82 is cut off. Cutting off the transistor 82 connects its collector near the potential of the juncion 19, whereupon the capacitor 93 is charged towards that potential.

By thus operating the transistors 81, 82, the output of the transistor 82, i.e., the voltage on its collector is a square wave. This can readily be seen from the fact that the collector of the transistor 82 is either at ground potential or the potential of the junction 19, depending upon whether the transistor 82 is conducting or nonconducting. Such square or rectangular waveforms are indicated in FIGURE 3, wherein the rectangular waveforms 96 are developed during the periods of the positive voltage excursions 30 of FIGURE 2—which represent the main work blows of the machine—wherein a rectangular waveform 97 is developed during the positive voltage excursion 30' of FIGURE 2—which represent auxiliary or pre-forming work blows—and wherein intermediate rectangular waveforms 98 are developed during those positive-going portions of the waveform of FIGURE 2 intermediate the work blows.

The duration of each rectangular waveform 96 (FIGURE 3) corresponding to the associated main work blow 30 (FIGURE 2) is sufficient to charge the integrator capacitor 93 to a level for effecting operation of remaining circuits of my invention. In this connection, by connecting the diode 90 in the forward direction between the capacitor 93 and the collector of the transistor 82, I prevent the charge on the capacitor 93 from leaking off through the transistor 82 following termination of the rectangular waveform, until the remaining circuits of my invention are set into operation as a result of the charge build-up on the capacitor 93.

Further in connection with charging of the capacitor 93, the intermediate rectangular voltages 98 representing noise spikes are of insufficient duration to effect a charge build-up on the capacitor to a level sufficient to trigger the following circuits. The rectangular voltage 97 corresponding to the auxiliary or pre-forming work blows would be of sufficient duration to charge the capacitor 93 enough to trigger the following circuits. However, provision is made in the following circuits to prevent the capacitor 93 from being charged by the voltages 97, 98.

Such following circuits comprise a Zener diode 100 which is connected to the capacitor 93, and a resistor 101 through which the Zener 100 is connected to a monostable multivibrator that is formed with PNP junction transistors 102, 103. The collectors of the respective transistors 102, 103 are connected through current limiting resistors 104, 105 to the junction 19 of regulated voltage, and the emitters of the transistors are connected directly to ground. Bias determining means for the transistor 102 include a resistor 106 connected between the resistor 105 and the base of the transistor 102, and a resistor 107 connected between such base and ground.

As shown, the base of the transistor 103 is connected through current limiting resistors to the junction 19 via a fixed resistor 110 and a variable resistor 111, which variable resistor is shown in the form of a rheostat. Also, the collector of the transistor 102 and the base of the transistor 103 are connected to terminals 112, 113, between which a capacitor 114 of selected value is connected. The capacitor 114 selected for connection between the terminals 112, 113 is chosen in accordance with the cycle time of the machine 12. For a given machine cycle time, the capacitor 114 is chosen with such value of capacitance to insure that when the multivibrator is switched to its unstable state, it is maintained in that state for a predetermined period extending to between the end of the negative excursions 31' of the pre-forming blows and the beginning of the positive excursion 30 of the next succeeding main work blows. As will become evident, this provision insures that the integrator capacitor 93 will not be charged during the occurrence of the rectangular voltages 97 (FIG. 3).

The Zener diode 100 is adapted to conduct upon the charge on the capacitor 93 reaching a predetermined level. For a given machine, the capacitor 93 is chosen of such value of capacitance as to insure that it is charged sufficiently during the main work blows to exceed the level required to cause the Zener 100 to conduct. In the absence of a charge on the capacitor 93 of a level sufficient to cause the Zener to conduct, the bias for the transistor 102 (established by the resistors 106, 107) is such as to hold the transistor 102 cut off. Accordingly, the collector of the transistor 102 is connected to the potential at the junction 19 when the transistor 102 is cut off. When the Zener 100 conducts, the transistor 102 is rendered conducting, thereby connecting its collector to ground.

During the quiescent condition in which the transistor 102 is cut off, the transistor 103 is conducting. This is apparent from the fact that the base of the transistor 103 is connected through the resistors 110, 111 to the potential of the junction 19. Accordingly, the capacitor 114 in the quiescent state of the multivibrator is connected between ground and the potential at the junction 19, whereby it is charged to a level approximating that potential.

Preparatory to describing the further operations of the multivibrator, attention is directed to the connection of a transistor 116 across the integrator capacitor 93, the emitter of such transistor being connected directly to ground, and its collector being resistively connected at 117 to the junction 118 between the Zener 100 and the terminal 91. A resistor 119 is connected between the base of the transistor 116 and the collector of the transistor 103, and a resistor 120 is connected between the base of the transistor 116 and ground.

During the quiescent state of the multivibrator, in which the collector of the transistor 103 is at ground potential, it follows that the base of the transistor 116 is also at ground potential, and that such transistor 116 is not conducting.

When the charge on the capacitor 93 is sufficient to cause the Zener 100 to conduct, the transistor 102 is rendered conducting, and the transistor 103 is cut off. In this connection, it should be noted that when the transistor 102 is rendered conducting, its collector moves from a negative potential to ground, which is a positive voltage excursion. Accordingly, the capacitor 114 directly couples this positive voltage excursion to the base of the transistor 103, thereby causing the transistor 103 to cut off.

Upon the transistor 103 being cut off, its collector moves to a negative potential. Such negative potential also appears at the resistor 106 and is reflected at the base of the conducting transistor 102. Thus, cutting off the transistor 103 results in a negative bias at the base of the transistor 102 to reinforce the conduction of the transistor 102. In this latter connection, it should be noted that the work blow that resulted in the charge on the integrator capacitor 93 that initiated conduction of the transistor 102 has disappeared. Accordingly, the feedback connection provided between the collector of the transistor 103 to the base of the transistor 102 is effective to keep the transistor 102 conducting and hence to keep the transistor 103 cut off. Such extended conduction of the transistor 102 and nonconduction of the transistor 103 continues for a period of time dictated by the time constant of the capacitor 114 and the resistors 110, 111.

Coincidentally with the negative bias established on the base of the transistor 102 via the resistor 106, it will be apparent that the base of the transistor 116 is moved to a negative potential. This causes the transistor 116 to conduct, thereby discharging the integrator capacitor 93 through the current limiting resistor 117 and the emitter-collector path of the transistor 116.

As previously indicated, the time constant of the capacitor 114 and the resistors 110, 111 is such as to prevent a charge voltage on the integrator capacitor 93 from building up during the periods between the main work blows. The charge on the capacitor 114 leaks off through the resistors 110, 111 until the reverse bias on the base of the transistor 103 is removed to render it conducting, and hence the negative bias via the resistor 106 is removed from the base of the transistor 102, thereby causing the transistor 102 to cut off. Similarly, the shorting switch provided by the transistor 116 is cut off upon removal of the negative bias on its base via the resistor 119.

The period determined by the aforementioned time constant of the capacitor 114 and the resistors 110, 111 is such that the integrator capacitor 93 is kept discharged via the transistor 116 for a substantial period following the main work blow 30 (FIGURE 2) and continuing past the intermediate work blow 30'. Thus, the rectangular voltage 97 (FIGURE 3), and the intermediate noise spikes 98 preceding it, are not effective to charge the integrator capacitor 93 but are bypassed directly to ground through the transistor 116.

FIGURE 4 illustrates the waveform of the integrated voltage developed across the capacitor 93. Referring to the idealized waveform of FIGURE 4, a charge voltage 124 across the capacitor 93 reaches a maximum during the main work blows, and is zero for a substantial period extending beyond the intermediate work blows, as above described. In this connection, the integrator may be charged slightly, as indicated at 125 in FIGURE 4, during the brief portions 98 of the rectangular wave (FIGURE 3) which correspond to short-duration spikes that occur between the voltage excursions 31', 30 associated with the intermediate work blows and the next succeeding main work blow. However, such a small charge is readily dissipated, as indicated at 126, before the next main work blow.

While the multivibrator is in its extended unstable state as above described, it causes a voltage of fixed magnitude to be applied to the input of a driver amplifier, which is comprised of a PNP junction transistor 128, the base of which is resistively connected at 129 to the collector of the transistor 103. As shown, the emitter of the transistor 128 is connected through a resistor 130 to the junction 19, and a diode 131 is connected between such emitter and ground. Voltages appearing at the collector of the transistor 128 are utilized to drive a counter in the desired manner.

The voltage applied to the base of the transistor 128 is indicated in FIGURE 5, wherein the output of the multivibrator, which in its stable state is zero volts, is lowered to a predetermined level 135 upon being triggered, such level being maintained until the end of the period dictated by the time constant of the capacitor 114 and resistors 110, 111, whereupon the multivibrator returns to its stable state, and its output returns to zero, as indicated at 136.

The transistor 128 is normally biased to an off condition. In this connection, it should be noted that the transistor 103 is normally conducting in the stable state of the multivibrator, and that the collector of the transistor 103 and the base of the transistor 128 are connected to ground potential. To insure against the collector of the transistor 103 moving to a slightly negative potential such as might cause the transistor 128 to conduct, the diode 131 is provided to maintain the emitter of the transistor 128 sufficiently negative so that the base-emitter path of the transistor 128 is back-biased. This arrangemen insures that the transistor 128 is rendered conductive only during the period when the multivibrator output is lowered to the level 135 indicated in FIGURE 5.

As previously indicated, the amplified output of the transistor 128 is available to operate a counter when the mutlivibrator is triggered. Referring to FIGURE 6 along with FIGURE 1, the counter is actuated to add a digit when the control voltage therefor moves to a predetermined level, indicated at 140 in FIGURE 6. In the example shown, such control voltage moves to the level 140 when the multivibrator output (FIGURE 5) moves to the level 135, i.e., when the charging voltage 124 (FIGURE 4) reaches a predetermined level. The counter may be an electronic counter, or it may be an electromechanical device, such as a Veeder-Root counter, having a driving coil to be energized in response to the operation of the driver amplifier.

While my invention has been described as using PNP junction transistors, wherein operations of the circuits of my invention are described in connection with negative reference voltage sources, it will be apparent that positive reference voltage sources may be employed, in which case NPN junction transistors would be used in place of the PNP junction transistors as described.

My invention has the desired advantage that strain gauges having special characteristics do not have to be selected. Rather, my invention operates reliably with a wide variety of strain gauges. Such flexibility is possible because the capacitors 93, 114 can readily be selected and the potentiometer 66, 111 can readily be set to accommodate the circuit for strain gauges which exhibit markedly different dimensional changes in response to stress.

In view of the foregoing, it will be evident that various modifications can be made in the circuitry shown and described without departing from the spirit and scope of my invention.

I claim:
1. In combination with an object that undergoes stresses of various magnitudes and durations throughout a cycle time which includes a work blow, wherein certain stresses begin and end at approximately the same points in each cycle and are characterized as being below a predetermined frequency, wherein other stresses below the predetermined frequency may occur at other points in the cycle, and wherein stresses above the predetermined frequency may occur during and between such certain stresses, an electronic network comprising:

means for developing A-C voltages which vary in accordance with all the stresses, said voltage developing means including a strain gauge to be mounted on the object and having a resistive element adapted to undergo changes in resistance conforming to the dimensional changes thereof;

amplifier means coupled to said voltage developing means;

filter means for limiting the frequency band of said amplifier means to develop an amplified voltage whereby the frequency components below the predetermined frequency are amplified to a substantially greater extent than the frequency components above the predetermined frequency;

means responsive to said amplified voltage to develop an output voltage representing only those portions of the amplified voltage that correspond to the certain stresses that begin and end at approximately the same points in each cycle;

and a source of super-regulated voltage, said resistive element being coupled between said source and a point of reference potential.

2. The electronic network of claim 1, wherein said amplifier means includes amplifier stages including respective transistors with base, emitter and collector electrodes, the emitter of each transistor being coupled to a point of reference potential, the collector of each transistor being connected through a respective pair of serially connected resistors to said source;

means capacitively coupling said resistive element to one of said transistors, the collectors and bases of successive transistors being capacitively coupled;

and respective capacitors connected between the point of reference potential and the junctions of said pairs of resistors.

3. The electronic network of claim 2, including gain control means for the last stage of said amplifier means; and means coupled to said last stage and responsive to the amplified voltage therefrom to develop a square wave.

4. The electronic network of claim 3, wherein said square wave developing means includes a pair of transistors each having base, emitter and collector electrodes, the emitter-collector paths of which are connected between the point of reference potential and a source of regulated voltage of greater magnitude than the super-regulated voltage, the base of one of which is capacitively coupled to the last stage of said amplifier means, the collector of said one being resistively coupled to the base of the other; and an integrator coupled to the collector electrode of said other of said pair of transistors.

5. The electronic network of claim 4, wherein said integrator includes a pair of terminals, one of which is connected to the point of reference potential, and the other of which is connected to the collector of said other transistor;
a capacitor removably connected between said terminals;
and a resistor connected between the collector of said other transistor and the source of regulated voltage.

6. The electronic network of claim 5, including a unidirectionally conductive device connected between said other terminal and the collector of said other transistor.

7. The electronic network of claim 6, including means coupled to said other terminal and responsive to a charge build-up on said capacitor only during work blows to develop a corresponding output voltage.

8. The electronic network of claim 7, wherein said last-named means includes a monostable multivibrator; means to operate said multivibrator when the charge on said capacitor reaches a predetermined level during a work blow;
switch means connected across said capacitor;
and means responsive to operation of said multivibrator to operate said switch means to prevent said capacitor from being charged during intervals between work blows.

9. The electronic network of claim 8, wherein said switch means includes a transistor having an emitter-collector path connected across said terminals, wherein said multivibrator includes two transistors having emitter-collector paths connected between said source of regulated voltage and the point of reference potential, one of said two transistors having an emitter-base path resistively connected to said source of regulated voltage;
a capacitor removably connected between the emitter-base path of said one and the emitter-collector path of the other of said two transistors;
a Zener diode for said multivibrator operating means connected to said other terminal, said other of said two transistors having a base connection to said Zener diode;
a base electrode for the transistor of said switch being resistively coupled to the emitter-collector path of said one of said two transistors;
and an output amplifier coupled to the emitter-collector path of said one of said two transistors.

References Cited

UNITED STATES PATENTS 3,346,725   10/1967   Allured et al. _____ 235—92

ROY LAKE, Primary Examiner

J. B. MULLINS, Assistant Examiner

U.S. Cl. X.R.

73—91; 307—233, 234, 235, 261, 268